United States Patent [19]
Hassel

[11] Patent Number: 6,080,939
[45] Date of Patent: Jun. 27, 2000

[54] MASS DETERMINATION DEVICE HAVING COUNTERBALANCED NORMALIZED TEMPERATURE COEFFICIENTS

[75] Inventor: David R. Hassel, Wynantskill, N.Y.

[73] Assignee: Rupprecht & Pataschnick Company, Inc., Albany, N.Y.

[21] Appl. No.: 09/097,043

[22] Filed: Jun. 12, 1998

[51] Int. Cl.[7] .............................. G01G 3/14; G01G 9/00; G01G 19/56; G01G 3/16

[52] U.S. Cl. ....................... 177/210 FP; 177/1; 73/1.13; 73/580

[58] Field of Search ..................... 177/1, 50, 210 FP; 702/101, 102, 106; 73/1.08, 1.13, 1.15, 580

[56] References Cited

U.S. PATENT DOCUMENTS

| | | | |
|---|---|---|---|
| 3,850,257 | 11/1974 | Teraoka | 177/226 |
| 3,926,271 | 12/1975 | Patashnick | 177/210 |
| 4,391,338 | 7/1983 | Patashnick et al. | 177/210 |
| 4,451,817 | 5/1984 | Zulliger | 177/211 |
| 4,836,314 | 6/1989 | Rupprecht et al. | 177/210 |
| 4,838,371 | 6/1989 | Rupprecht et al. | 177/210 |
| 4,855,260 | 8/1989 | Dumbaugh, Jr. et al. | 501/66 |
| 5,232,063 | 8/1993 | Stoller | 177/210 FP |
| 5,391,844 | 2/1995 | Johnson et al. | 177/229 |
| 5,442,146 | 8/1995 | Bell et al. | 177/210 FP |
| 5,461,918 | 10/1995 | Mozurkewich | 73/580 |
| 5,488,203 | 1/1996 | Hassel et al. | 177/184 |

FOREIGN PATENT DOCUMENTS

| | | |
|---|---|---|
| 2-324364 | of 0000 | Japan . |
| 2-161323 | of 1990 | Japan . |
| 2 098 744 | of 1982 | United Kingdom ............. G01G 3/18 |

*Primary Examiner*—Randy W. Gibson
*Attorney, Agent, or Firm*—Heslin & Rothenberg, P.C.

[57] ABSTRACT

A mass determination device includes a combination of an elastic element connected with a mass holder. The combination has a normalized temperature coefficient of frequency substantially equal to zero over a temperature range of intended use for the mass determination device, whereby mass determination accuracy of the device during temperature change in the range is enhanced. The elastic element has a first normalized temperature coefficient of frequency over the temperature range. A second normalized temperature coefficient of frequency over the temperature range attributable to the mass holder is determined. The first normalized temperature coefficient and the second normalized temperature coefficient are substantially counterbalanced over the temperature range, for example, through material selection and/or heat treatment of the elastic element and/or material or geometry variation of the mass holder.

20 Claims, 5 Drawing Sheets

102

MASS DETERMINATION DEVICE HAVING COUNTERBALANCED NORMALIZED TEMPERATURE COEFFICIENTS

TECHNICAL FIELD

This invention relates, generally, to mass measurement devices and, more particularly, to reducing adverse effects of temperature change upon the performance of mass determination by mass measurement devices, especially inertial mass measurement instruments including particulate matter measurement instruments.

BACKGROUND ART

A particulate mass measurement device can employ an elastic element and a connected particulate matter collector, which may be a filter. The mass measurement device operates by measuring changes in frequency based on mass loading. Namely, the elastic element and the collector are made to oscillate at a resonant frequency that changes with particulate mass loading onto the collector. Exemplary construction and operation of such a mass measurement device are disclosed in U.S. Pat. Nos. 3,957,469 and 4,391,338 assigned to the same assignee as this application, which patents are hereby incorporated herein by reference in their entirety. Other, tuning fork type inertial mass measurement devices are disclosed in Japanese patent publications JP 2-161323 and JP 2-324364.

Often, the mass measurement device is employed under changing ambient temperatures. In order to measure mass accurately, such a device usually requires careful control of the temperature of the elastic element and the filter.

Hence, a common practice is to hold the temperature of the elastic element and the filter at a very steady value above the highest expected ambient temperature. However, this practice requires disadvantageously large energy expenditures at low ambient temperatures. Such energy expenditures would require unsuitably large batteries in, for example, portable instruments. Furthermore, if the elastic element and the filter are held at a temperature too high above a certain transitory ambient temperature, then the character of sample mass collected can be adversely altered.

One known configuration for measurement of mass which reduces error due to temperature change of the elastic element employs a technique of bringing as close to zero as possible the temperature coefficient of elastic modulus of the elastic element. In particular, the composition of elastic glass members is altered in order to produce a near-zero temperature coefficient of elastic modulus. Such an arrangement is disclosed in U.S. Pat. No. 4,855,260 to Dumbaugh, Jr. et al. (entitled "Glasses Exhibiting Low Thermal Coefficients of Elasticity," issued Aug. 8, 1989, and assigned to Corning Incorporated). Undesirably, this production of near-zero temperature coefficient of elastic modulus employs processes which are expensive in terms of labor, material, and time. Further, an inertial balance can include the elastic element plus a substrate surface upon which mass is deposited. However, the earlier design does not address effects of the substrate surface on the overall temperature coefficient. Should a formation of the substrate surface or its equivalent contribute a significant component to temperature response of the inertial balance, mass measurement performance of the inertial balance would fail to be optimized.

Thus, a need exists for a mass measurement device having an elastic element and a mass holder, where the device has enhanced accuracy of mass determination in the presence of changing temperature, while reducing or eliminating the need for active temperature control for the device.

SUMMARY OF THE INVENTION

Pursuant to the present invention, shortcomings of the existing art are overcome and additional advantages are provided through the provision of a mass determination device having constituent material processed and/or selected to obtain desired enhancement of mass determination accuracy during temperature change. Preferably, normalized temperature coefficients of frequency attributable to, for example, an elastic element and a mass holder, are substantially counterbalanced. As discussed further below, a temperature coefficient of frequency is the slope of the frequency versus temperature curve obtained while varying temperature and observing the oscillation frequency of the total oscillating mass of the mass determination device.

According to the present invention, a mass determination device includes a combination of an elastic element connected with a mass holder. The combination has a normalized temperature coefficient of frequency substantially equal to zero over a temperature range of intended use for the mass determination device, whereby mass determination accuracy of the device during temperature change in the range is enhanced.

In one aspect of the invention, the elastic element can have a first normalized temperature coefficient of frequency over the temperature range. A second normalized temperature coefficient of frequency over the temperature range is attributable to the mass holder. The first normalized temperature coefficient and the second normalized temperature coefficient can be substantially counterbalanced over the temperature range.

The elastic element can comprise a hollow tubular member. The mass holder can comprise a filter.

The elastic element and the mass holder can comprise an inertial balance. The elastic element can be composed of an Invar alloy and/or an Invar-type alloy.

In another aspect of the invention, a mass determination device includes an elastic element connected with a mass holder. The elastic element has a first normalized temperature coefficient of frequency over a temperature range of intended use for the mass determination device. A second normalized temperature coefficient of frequency over the temperature range is attributable to the mass holder. The first normalized temperature coefficient and the second normalized temperature coefficient are substantially counterbalanced over the temperature range, whereby mass determination accuracy of the device during temperature change in the range is enhanced.

In yet another aspect of the present invention, the elastic element and the mass holder can comprise a combination having a normalized temperature coefficient of frequency substantially equal to zero over the temperature range.

The invention further contemplates a process for enhancing accuracy of a mass determination device adapted to operate during temperature change in a temperature range of intended use for the mass determination device. The device includes a combination of an elastic element with a mass holder. For an assembly of a test item elastic element with the mass holder, a first normalized temperature coefficient of frequency over the temperature range is determined. For the test item alone, a second normalized temperature coefficient of frequency over the temperature range is determined. The first and second normalized temperature coefficients are employed to derive a third normalized temperature coefficient of frequency attributable to the mass holder alone, over the temperature range. This third normalized temperature coefficient cannot be measured directly, but only as the difference between the first and second coefficients.

In a further aspect of the invention, behavior of the first, second and third normalized temperature coefficients is mapped over the temperature range.

Comparison of the second and third normalized temperature coefficients yields information which can be employed to modify heat treatment and/or select a material composition and/or otherwise vary the formation of a final product elastic element in such a way that, in an assembly employing the final product elastic element, the first normalized temperature coefficient is substantially zero.

The invention also contemplates a process for enhancing accuracy of a mass determination device adapted to operate during temperature change in a temperature range of intended use for the mass determination device. The device includes a combination of an elastic element with a mass holder. For an assembly of a test item mass holder with the elastic element, a first normalized temperature coefficient of frequency over the temperature range is determined. For the elastic element alone, a second normalized temperature coefficient of frequency over the temperature range is determined. The first and second normalized temperature coefficients are employed to derive a third normalized temperature coefficient of frequency over the temperature range attributable to the test item mass holder.

Comparison of the second and third normalized temperature coefficients yields information which can be employed to modify material selection, processing and/or holder geometry for the formation of a final product mass holder so that in the final product combination the first normalized temperature coefficient is substantially zero.

Thus, the present invention advantageously recognizes that, in a mass determination device including an elastic element connected with a mass holder, the mass holder plays a role in determining the response of the device to temperature changes. Further, portions of the device (e.g., the elastic element and the mass holder) are made to exhibit counterbalanced normalized temperature coefficients of frequency, so the device has fewer temperature induced errors over a selected range of temperatures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a mass determination device is provided in which tailoring of properties of an elastic element and/or a mass holder serves to largely eliminate error(s) induced by temperature change(s).

Figure 1:
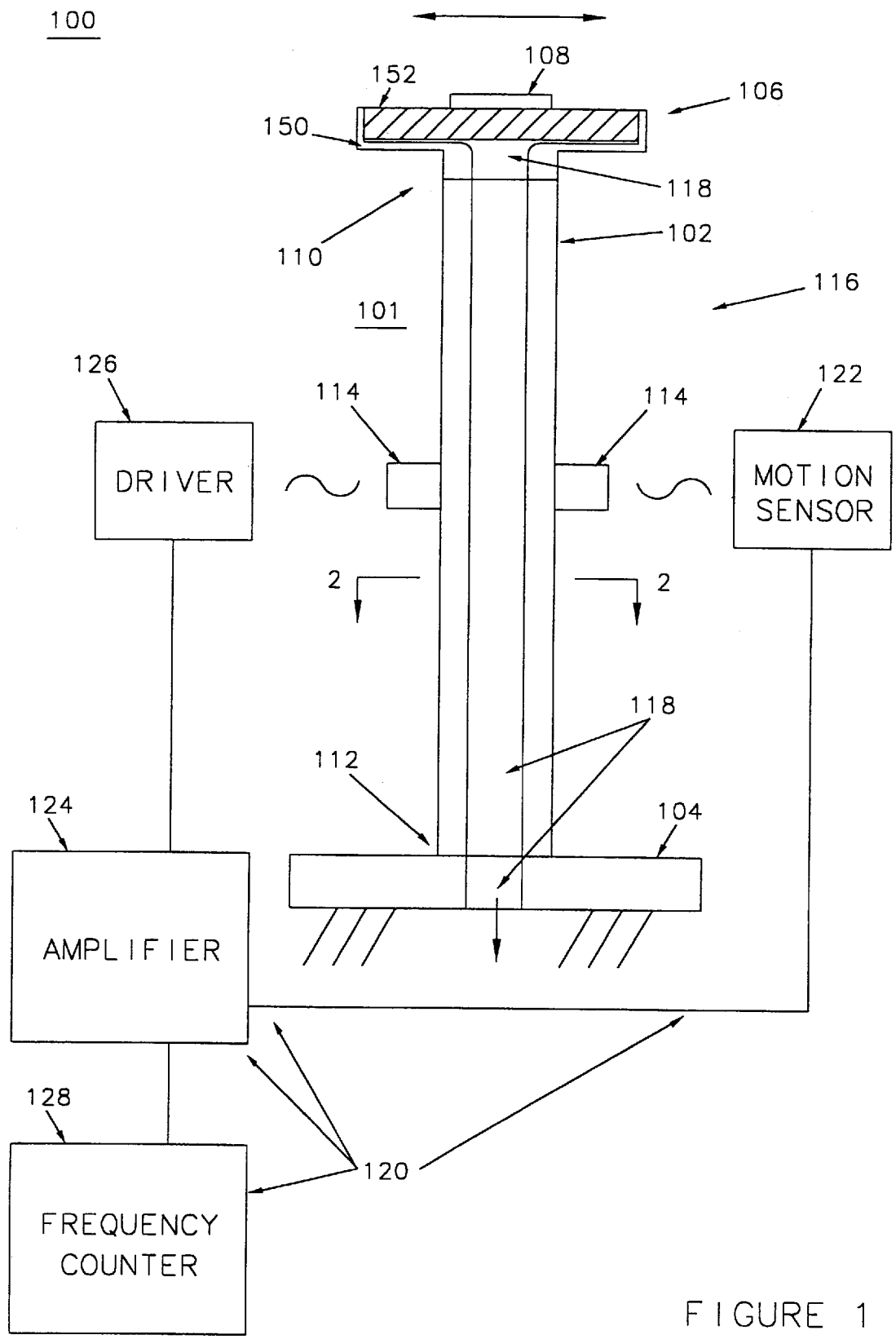
FIG. 1 depicts one example of a mass determination device incorporating and using the counterbalanced normalized temperature coefficients of frequency of the present invention.

An example of a mass determination device incorporating and using the novel features of the present invention is depicted in FIG. 1 and described in detail herein.

In this exemplary embodiment, a mass determination device generally denoted 100 includes a mass transducer 101 comprised of elastic element 102, (one end of which is fixed to anchor 104) and mass holder 106. The mass holder is suited for holding sample mass 108, as described herein.

Mass determination device 100 may include, for example, an inertial balance. As is known in the art, an inertial balance serves to measure mass rather than weight. For a given object, mass is the same everywhere; mass does not vary. Conversely, weight can vary depending upon location on or off of the Earth, other planet(s), or satellite(s). Namely, weight is the amount of force something exerts on account of gravity. For measurement of weight, such as with a spring scale, one desires stillness in order to measure displacement of the spring caused by gravitational force. For mass determination with a pan-type balance, one sets up a pivot point and balances a known mass against an unknown mass. Such an arrangement nevertheless requires gravity, and is complicated by buoyancy unless performed in a vacuum chamber.

In contrast, an inertial balance does not require gravity, or any external force. Inertial balances are entirely self-contained. An inertial balance generally requires only an elastic element 102, an anchor 104, and a mass holder 106, for holding a sample mass 108.

As depicted in FIG. 1, elastic element 102 has a cantilever construction with a first free end 110 and a second clamped end 112. A mass holder 106 is affixed to the first end. The second end is fixed to anchor 104. As represented in FIG. 1, the anchor is in turn fixed (e.g., bolted) to a large mass, for instance, a mass which is stable with respect to a surface of the Earth. The anchor is anchored so as to not absorb and/or consume energy intended to maintain oscillation of total oscillating mass 116, which is discussed in detail herein.

Any number of part(s) of mass determination device 100 may be formed integrally. For example, elastic element 102 and anchor 104 may be formed integrally, where one could consider second end 112 to be anchored to a large mass such as has been discussed above. In another example, the elastic element and mass holder 106 may be formed integrally.

Portion(s) of elastic element 102, mass holder 106, and/or sample mass 108 may form total oscillating mass 116. If the mass determination device includes optional target(s) 114 connected to the elastic element, then the total oscillating mass may further include portion(s) of the optional target(s), as will be appreciated by those skilled in the art. The optional target(s) are discussed further below.

Mass transducer 101, when motivated as described herein, will vibrate or oscillate at a first resonant frequency, that is, a frequency of gross motion of mass determination device 100. Oscillation or vibration of the mass transducer with sample mass 108 added thereto will result in a second resonant frequency lower than the first resonant frequency of oscillation for the mass transducer alone, as will be understood by those skilled in the art.

The following procedure allows calibration of mass measurement: One can locate a known mass on mass holder 106 and then measure an oscillation frequency for total oscillating mass 116. If one also measures the oscillation frequency without the known mass, namely the oscillation frequency of the mass transducer alone, one can determine the calibration constant for the mass transducer of mass determination device 100. Thereafter, for a given instance of a sample mass 108, appropriate mathematical formula(e) can be applied to relate the given instance of the sample mass to the resonant frequency of the mass transducer plus the given instance of the sample mass, as will be appreciated by those skilled in the art.

As described herein, a vibration or oscillation is introduced into total oscillating mass 116 at a natural or resonant frequency for the mass transducer plus sample mass 108, where the sample mass is variable, in accordance with the principles of the present invention. For each distinct sample mass 108 to be measured, determined, or evaluated, there is a distinct resonant frequency for the mass transducer plus that distinct sample mass, as will be appreciated by those skilled in the art.

Elastic element 102 may be formed from metal, glass, ceramic, and/or other material(s). In one preferred embodiment, the elastic element is composed of at least one Invar and/or Invar-type alloy(s). Metals exhibiting low thermal coefficients of elastic modulus, good dimensional stability, low thermal expansion, good yield strength, easy fabrication, and controllable heat treatment are desirable candidates for the elastic element.

Figure 2:
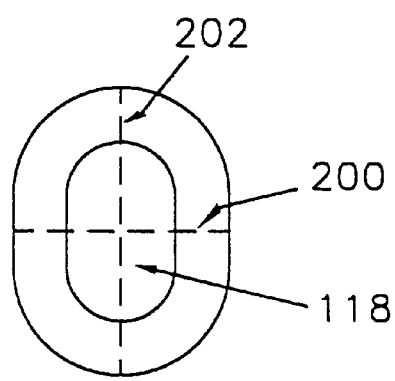
FIG. 2 is a cutaway, sectional, partial view directed substantially along line 2—2 of FIG. 1, illustrating an exemplary ellipticity.

Elastic element 102 may take many different forms and constructions. In one embodiment, elastic element 102 may comprise a cantilevered beam or tubular member. As depicted in FIGS. 1–2, the elastic element may further comprise a hollow, elliptical tubular member. For example, ellipticity of the elastic element may be achieved by squeezing in one direction an initially cylindrical tubular member. The ellipticity of the elastic element depicted in FIG. 2 serves to keep the elastic element oscillating substantially in one direction, namely, substantially along minor axis 200, thereby easing determination of oscillation frequency, as discussed herein.

Referring to FIG. 2, the ellipticity of elastic element 102 is preferably arranged so the elastic element oscillates generally orthogonally with respect to major axis 202 thereof, that is, generally along minor axis 200. In particular, the elastic element is preferably disposed with respect to driver 126 (FIG. 1) such that the major axis is disposed generally orthogonally with respect thereto. The driver and other preferred components of feedback system 120 (FIG. 1) are described further below.

In a further embodiment, elastic element 102 may resemble a tapered element such as is disclosed in the above-incorporated U.S. Pat. No. 4,391,338 to Patashnick et al. (entitled "Microbalance and Method for Measuring the Mass of Matter Suspended Within a Fluid Medium," issued Jul. 5, 1983) and U.S. Pat. No. 3,926,271 to Patashnick (entitled "Microbalance" and issued Dec. 16, 1975). Alternatively the elastic element may resemble a conventional tuning fork as shown, for example, in Japanese patent publications JP 2-161323 and/or JP 2-324364.

Referring to FIG. 1, mass holder 106 may take many different forms such as a filter, an impaction plate, or a container, and may be attached to the free end 110 of the elastic element 102 in any suitable fashion. For illustrative purposes, FIG. 1 depicts the mass holder 106 as a filter which includes filter housing 150 and filter medium 152. Preferably, the filter housing facilitates attachment of the mass holder to first end 110 of elastic element 102. Moreover, the filter housing preferably supports the filter medium. Further, the filter housing may serve to seal and/or encase the filter medium. The filter housing may be formed from plastic, aluminum, and/or other material(s). The filter medium may comprise, for instance, glass cloth coated with a polytetrafluoroethylene ("PTFE") material manufactured by E. I. Du Pont De Nemours Company and sold under the trademark TEFLON®. The filter may include any number of member(s).

In one aspect of the present invention, part(s) of mass determination device 100 may have any desired orientation, or no set orientation at all, such as may be appropriate for applications in outer space. Furthermore, any desired configuration may be used to introduce sample mass 108 to mass holder 106. For example, a reduced pressure generated in optional passageway 118 of elastic element 102 may draw, for instance, air containing particulate matter to a filter which serves as the mass holder. Such a passageway 118, or flow in general, may have any configuration or direction. In another example, sample mass 108 may be projected or moved to an impaction plate serving as the mass holder. In a still further example, the mass holder may allow manual placement of sample mass 108 thereupon.

Referring to FIG. 1, in one embodiment feedback system 120 motivates oscillation or vibration of total oscillating mass 116. Further, the feedback system reinforces gross motion, that is, the resonant frequency of total oscillating mass 116 of mass determination device 100. The feedback system may include motion sensor 122 coupled to amplifier 124, which is in turn coupled to driver 126 and frequency counter 128, as discussed herein.

Optional target(s) 114 (FIG. 1) may include an object located on elastic element 102 for interaction with driver 126 and/or motion sensor 122. In one embodiment, portion(s) of the target(s) may be formed integrally with the elastic element such that the driver and/or the sensor interact directly with the elastic element itself.

For example, target(s) 114 may include a metal (e.g., aluminum or stainless steel) disk. The driver serves to provide an inertial force which may include various type(s) of input(s) or excitations(s), for example, magnetic, and/or electrostatic. The driver preferably excites the elastic element symmetrically, that is, along a central axis thereof. The motion sensor 122 may include, for instance, coil(s), and/or photoelectric cell(s). The motion sensor may sense any appropriate portion of total oscillating mass 116, since all portions of the total oscillating mass oscillate at the resonant frequency thereof.

In one example, motion sensor 122 measures a frequency of oscillation of target(s) 114 and transmits representative signal(s) to amplifier 124. As appropriate, the motion sensor can observe any selected characteristic (e.g., displacement, and/or velocity) of total oscillating mass 116. The amplifier receives this information and produces an amplified signal as will be appreciated by those skilled in the art.

Once mass 116 begins oscillating or vibrating, the mass will assume a natural frequency therefor, albeit at an initially small amplitude.

Motion sensor 122 detects this initial oscillation and corresponding natural frequency, and transmits representative signal(s) therefor to amplifier 124, which imbues the signal(s) with sufficient energy for driver 126 to increase the oscillation or vibration amplitude of total oscillating mass 116, as will be appreciated by those skilled in the art. In one aspect, during oscillation or vibration of the mass, the amplifier serves to make up for energy losses in amplitude due to, for example, drag (e.g., windage) or internal friction.

Referring still to FIG. 1, frequency counter 128 coupled to amplifier 124 preferably serves as an interface for mass determination device 100. For example, the frequency counter may serve as an observation point, allowing a user to monitor or evaluate activity of total oscillating mass 116.

The sample mass comprises an object (e.g., dust or particulate) whose mass is to be determined. The tare mass includes all oscillating mass of the mass determination device present before the sample mass is collected. Namely, the tare mass includes all mass of mass determination device 100 which oscillates. Any mass of the mass determination device which is not in motion does not contribute to the resonant or oscillation frequency, and is therefore not part of the tare mass. At a certain time and in a particular embodiment of the mass determination device, the tare mass may include mass holder 106, a portion of elastic element 102, any fluid present within an oscillating portion (e.g., air present within an oscillating portion of a tubular element 102) of the mass determination device, optional target(s) 114 as well as any interconnecting material (e.g., glue) therefor, as will be understood by those skilled in the art. During continuous operation, the tare mass may further include instance(s) of sample mass previously collected and still present (e.g., in a filter serving as the mass holder) when a new sample mass 108 is to be evaluated, as will be appreciated by those skilled in the art.

In a preferred use of mass determination device 100, one would measure a first resonant frequency of total oscillating mass 116 before a given sample mass 108 is added thereto. Then, one would measure a second resonant frequency of that pre-existing tare mass plus the given sample mass. Applying appropriate mathematical formula(e) to these first and second frequencies allows mass determination for the given sample mass. Such calculations can be made manually or automatically (e.g., by a digital computer), and displayed in any manner (e.g., analog or digital readings or graphs). In a preferred embodiment, one obtains a graph of frequency change versus time. Further, through application(s) of mathematical formula(e) to the frequency change, one can obtain a graph of total mass 130 at any instant in time, as well as a graph of the increase in mass versus time, referred to as "mass rate." Moreover, one may take the rate at which mass is increasing divided by the flow rate of fluid (e.g., air or other gas) flowing (e.g., through a filter serving as mass holder 106) in order to advantageously obtain a graph of concentration of sample mass (e.g., dust or particulate) 108 in the fluid.

Any portion(s) of mass determination device 100 may be formed from any appropriate material. Preferably, the material(s) are selected and/or formed to have a number of desired properties with respect to factor(s) such as intended temperature region(s), use(s), environment(s), application(s), and/or condition(s). The present invention can be advantageously employed for whatever specifications are selected.

In one preferred embodiment, portion(s) of mass determination device 100 are designed or optimized in view of the following specifications. The expected operating and ambient temperatures are preferably in the range −100 to 700 degrees Celsius, and are most preferably in the range 20 to 60 degrees Celsius. The length of a combination of an elastic element 102 connected with a mass holder 106 is preferably in the range 2 to 50 cm, and is most preferably in the range 5 to 15 cm.

With respect to exemplary embodiments of mass holder 106 which include a filter in the form of a disk, the major diameter of the disk may be approximately 1.5 cm.

Figure 3:
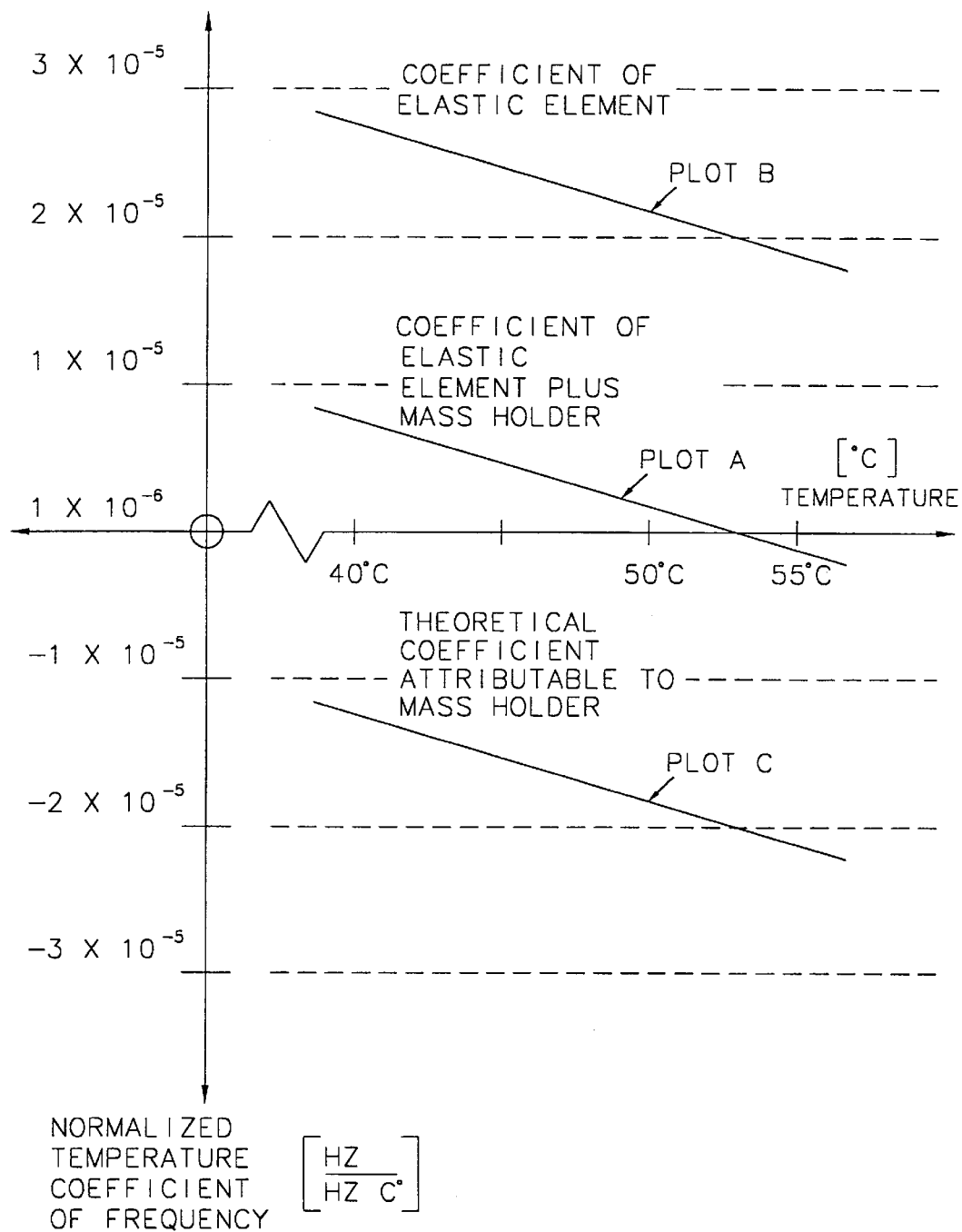
FIG. 3 represents a graph of one example of counterbalanced normalized temperature coefficients of frequency for portions of the mass determination device of FIG. 1.

FIG. 3 illustrates a graph of normalized temperature coefficient of frequency, as the ordinate, versus temperature, as the abscissa. As described herein, the temperature coefficient of frequency is the slope of the frequency versus temperature curve in the temperature region of interest. In one preferred embodiment, this slope value is normalized through division by a selected constant in the form of an average frequency of total oscillating mass 116 over the temperature region of interest. The subject temperature is the temperature of the total oscillating mass and its surroundings. Further, the frequency is the oscillation frequency of the total oscillating mass.

As is known, a coefficient is a number which results from collecting data and applying mathematical formula(e) to the data. The temperature coefficient of frequency may be expressed in units of Hertz per degree Celsius. Further, the temperature coefficient of frequency is preferably normalized to frequency, where normalization simply represents scaling of values. As will be understood by those skilled in the art, normalization of the temperature coefficient of frequency allows comparison of different elastic elements 102 of different total oscillating masses 116 at different oscillation frequencies. Units for the normalized temperature coefficient of frequency may be reduced to the inverse of degree Celsius. For clarity, the normalized temperature coefficient of frequency is preferably expressed in units of Hertz per Hertz per degree Celsius.

For explanatory purposes, an introductory description of exemplary general features of FIG. 3 is now provided. In particular, a given ordinate of the normalized temperature coefficient of frequency for a given abscissa of the temperature may be obtained by taking the slope at that given abscissa temperature on a curve (not shown, yet capable of exhibiting any number of behaviors, properties and/or characteristics, in accordance with principles of the present invention) of frequency versus temperature, as will be appreciated by those skilled in the art. The change in slope of the curve of frequency versus temperature may plot as a generally straight line, as represented in FIG. 3. In particular, a derivative of an equation for the curve of frequency versus temperature may theoretically yield a generally straight line, as illustrated in FIG. 3.

The plots in the graph of FIG. 3 are described herein as generally straight, for purposes of illustration. Nevertheless, these plots represent whatever is obtained from plotting the data obtained as described herein. Namely, the plots of the graph of FIG. 3 may include curves, depending on, for example, type(s) of material(s) involved. In accordance with the principles of present invention, data is collected for use in counterbalancing normalized temperature coefficients of frequency independently from any shape of any curve or line with which the data may be associated. For example, one may make use of the data as a continuous yet undefined function in order to manipulate, for instance, the processing and/or composition of material(s) to obtain a desired outcome of the normalized temperature coefficient of total oscillating mass 116 being driven within a selected tolerance of zero over a temperature range of interest.

For exemplary applications of mass determination device 100, preferred tolerances relative to a zero value for the overall normalized temperature coefficient of frequency are now recited. For evaluation of ambient air, the tolerance may be approximately $\pm 1*10^{-6}$ Hertz per Hertz per degree Celsius. For evaluation of health risks in a mine, the tolerance may be approximately $\pm 1*10^{-5}$ Hertz per Hertz per degree Celsius. For evaluation of pollution from a smokestack, the tolerance may be approximately $\pm 5*10^{-5}$ Hertz per Hertz per degree Celsius. In accordance with the principles of the present invention, the tolerance for the normalized temperature coefficient of frequency is selected based upon intended application(s) of an instance of mass determination device 100. With respect to design and operation of a given mass determination device 100, factor(s) other than the normalized temperature coefficient of frequency are expected to cause error(s) in the mass determination of magnitude larger than the tolerance selected for the normalized temperature coefficient of frequency.

With reference to FIG. 1, one may encase elastic element 102, anchor 104, mass holder 106, any optional target(s) 114, motion sensor 122, and driver 126 in a temperature-controlled environment, that is, for which the temperature may be varied. Further, for various steady temperature points, one may record the frequency as provided by frequency counter 128. Plotting these frequencies, for example, at intervals of one degree Celsius over a desired range, yields the above-described curve of frequency versus temperature over the desired range. Namely, these frequencies may be plotted as discrete points which are then interconnected to form a continuous curve. Locally on this curve, the slope is determined to obtain the temperature coefficients of frequency, which are normalized for the graph of FIG. 3.

In one aspect, the present invention advantageously maps behavior of the normalized temperature coefficient of frequency for total oscillating mass 116, and/or selected portion(s) thereof, over a selected range of temperatures, or at a certain temperature.

One example of how total oscillating mass 116 in the form of a combination of an elastic element 102 and a mass holder 106 is formed to yield an overall normalized temperature coefficient of frequency within a selected tolerance of zero for a certain temperature operating range for mass determination device 100 is described below with reference to FIGS. 4A–4B. Advantageously, the following steps allow evaluation and optimization of normalized temperature coefficients of frequency for a number of components of the mass transducer.

At STEPS 400 and 402, an elastic element 102 is designed and a heat treatment is specified therefor on the basis of strength, stability, and fatigue resistance. Further, the specification generally aims to minimize quantity of tare mass. Notably, STEPS 400 and 402 need not specify a particular normalized temperature coefficient of frequency for the elastic element.

As will be understood by those skilled in the art, heat treatment may involve any control of temperature, time, rate, and/or atmosphere (e.g., air, hydrogen, cracked gas, carbon monoxide, vacuum, and/or argon). Exemplary heat treatments include annealing, tempering, hardening, and/or quenching.

At STEP 404, mass holder 106 is designed through consideration of criteria such as total capacity, pressure drop, flow capability, and strength.

At STEP 406, several identical or nearly identical instances of elastic element 102 are fabricated, per the design geometry specified at STEP 400. In particular, these instances of the elastic element are fabricated uniformly in order to be substantially the same, within a certain manufacturing tolerance. At STEP 408, one of the instances of the elastic element fabricated in STEP 406 is heat treated according to the heat treatment previously specified in STEP 402. Namely, the elastic element heat treated at STEP 408 preferably serves as a test item, as described herein.

At INQUIRY 410, an assembly including mass holder 106 and the first instance of elastic element 102, is evaluated to determine whether the normalized temperature coefficient of frequency is satisfactory. For example, referring to PLOT A of FIG. 3 and considering a temperature of intended use for mass determination device 100 of approximately 50 degrees Celsius (e.g., ±0.1 degree Celsius), one might take measurements of frequency at, for instance, 46 degrees Celsius, 48 degrees Celsius, 50 degrees Celsius, and 52 degrees Celsius of the oscillating assembly within mass determining device 100. As discussed in detail above, these measurements can be used to determine the temperature coefficients of frequency between these temperatures. In one example, the temperature coefficient of frequency is relatively small, so determinations thereof at relatively large intervals (e.g., two degrees Celsius) serve to allow detection of a change in the temperature coefficient of frequency.

In one example, the information obtained in this exemplary iteration for the temperature of intended use of approximately 50 degrees Celsius (e.g., ±0.1 degree Celsius) may be advantageously employed for a different temperature of intended use of such as approximately 52 degrees Celsius (e.g., ±0.1 degree Celsius), since the normalized temperature coefficients of frequency in the region of interest have already been determined. In another example, a procedure such as is illustrated in FIGS. 4A–4B may be repeated for any temperature of intended use, and/or for any desired tolerance or degree of accuracy.

Continuing in the description of INQUIRY 410, the temperature coefficients of frequency may be employed for determination and/or evaluation of the normalized temperature coefficients, as described above. If the normalized temperature coefficient of frequency for the evaluated assembly is within a selected tolerance of zero for the subject temperature operating range, then, indicative of success, the procedure exits INQUIRY 410 for termination at STEP 412. Otherwise, if the normalized temperature coefficient of frequency for the assembly is unsatisfactory, then the procedure progresses from INQUIRY 410 to STEP 414 (FIG. 4B).

At STEP 414, the normalized temperature coefficient of frequency for the assembly without mass holder 106, that is, focusing on elastic element 102, is determined over a temperature range, PLOT B of FIG. 3. For example, the mass holder may be removed while a remaining portion of mass determination device 100 is tested.

At STEP 416, the normalized temperature coefficient of frequency from INQUIRY 410 (i.e., with respect to an assembly of elastic element 102 with mass holder 106) and the normalized temperature coefficient of frequency of STEP 414 (i.e., focusing on the elastic element) are employed to graph the theoretical normalized temperature coefficient of frequency attributable to the mass holder, PLOT C of FIG. 3. In particular, at STEP 416 the normalized temperature coefficient of frequency for the elastic element (determined in STEP 414) may be subtracted from the normalized temperature coefficient of frequency for the assembly of elastic element with the mass holder (obtained for INQUIRY 410) in order to theorize the normalized temperature coefficient of frequency attributable to the mass holder, as represented by PLOT C in FIG. 3. Thus, STEP 416 advantageously addresses the challenge that a normalized temperature coefficient of frequency attributable to the mass holder in the context of a given oscillating assembly also including a portion of an elastic element 102 cannot be directly measured independently from the elastic element.

At STEP 418, the knowledge gained in STEP 416 is employed to modify the heat treatment parameters for a given elastic element 102 fabricated at STEP 406 above. For example, the peak temperature and/or the amount of time spent at the peak temperature may be modified for the heat treatment for the elastic element. Increasing the temperature of heat treatment, for instance, for the elastic element can increase the magnitude of the normalized temperature coefficient of frequency for the elastic element. Further, decreasing the temperature of heat treatment for the elastic element can decrease the magnitude of the normalized temperature coefficient of frequency for the elastic element. In particular, STEP 418 aims to substantially counterbalance over a temperature range the normalized coefficient of frequency for the elastic element and the normalized coefficient of frequency for mass holder 106, in accordance with the principles of the present invention.

For illustrative purposes, an example is now presented. For instance, the temperature of interest may be 50 degrees Celsius. The normalized temperature coefficient of frequency attributable to mass holder 106 theorized at STEP 416 might be $-1.7*10^{-5}$ Hertz per Hertz per degree Celsius, at 50 degrees Celsius. Further, the normalized temperature coefficient of frequency focusing on elastic element 102 and obtained at STEP 414 might be $2*10^{-5}$ Hertz per Hertz per degree Celsius, at 50 degrees Celsius. Then, in accordance with the principles of the present invention, STEP 418 preferably modifies the heat treatment in order to decrease the normalized temperature coefficient of frequency of the elastic element by $0.3*10^{-5}$ Hertz per Hertz per degree Celsius, at 50 degrees Celsius, to an optimized value of $1.7*10^{-5}$ Hertz per Hertz per degree Celsius, at 50 degrees Celsius, thereby counterbalancing the normalized temperature coefficient of frequency attributable to the mass holder at the temperature of interest.

The following scenario and explanation are provided for illustrative purposes. Consider an assembly, e.g. mass transducer, composed of only an elastic element 102 and a mass holder 106. Once the mass holder is constructed, the normalized temperature coefficient of frequency does not change for that mass holder in the design of the assembly which includes the elastic element, so long as the geometry of the elastic element is fixed. Thus, one can modify the construction of and/or processing method(s) for the elastic element to be combined with that mass holder in the assembly in order to optimize the normalized temperature coefficient of frequency for the assembly, by varying the normalized temperature coefficient of frequency concerning the elastic element while considering the normalized temperature coefficient of frequency attributable to the mass holder to be constant. That is, one can iterate different formations of the elastic element in order to optimize toward a desired value of normalized temperature coefficient of frequency concerning the elastic element, without also iteratively assembling each designed elastic element in combination with the mass holder, since the desired value of the normalized temperature coefficient of frequency concerning the elastic element in this context does not change. Such a procedure is represented in STEP 418.

At INQUIRY 420, if the heat treatment specified at STEP 418 satisfies parameters, then STEP 422 heat treats another (e.g., a second, a third, etc.) instance of the elastic elements which were fabricated at STEP 406. That is, the elastic element heat treated at STEP 422 preferably serves as a test item, as discussed herein. From STEP 422, INQUIRY 410 (FIG. 4A) is made, which has already been described above.

Advantageously, in one preferred embodiment, heat treatment of elastic element 102 can provide a fairly broad range of acceptable behavior for mass determination device 100. Also, the heat treatment of the elastic element may be accomplished relatively efficiently, simply, and inexpensively.

Furthermore, at INQUIRY 420, if the heat treatment parameters for elastic element 102 have been forced to their limit, that is, the parameters cannot be changed any further as would be necessary to obtain a desired normalized temperature coefficient of frequency within a selected tolerance for the assembly, there exists the option of changing parameter(s) for mass holder 106 by proceeding to STEP 424. For instance, STEP 424 may entail changing geometry and/or material for the mass holder to obtain the desired normalized temperature coefficient of frequency of the assembly.

Namely, STEP 424 and subsequent STEP 404 may carry out a process comparable to that described above with respect to STEP 418 by altering the geometry and/or material of a mass holder 106, without altering an elastic element 102, as will be appreciated by those skilled in the art. Namely, the mass holder processed at STEPS 424 and 404 preferably serves as a test item, as described herein. For instance, STEP 424 may be employed to cope with a temperature range at which appropriate or desirable heat treatment options for elastic element 102 have been exhausted.

Moreover, a filter serving as a mass holder 106 may be designed for a certain purpose in a manner which limits the range of available adjustments of design of the mass holder. For example, a filter serving as the mass holder 106 may be formed having a relatively large diameter for a tubular element therein to provide relatively lower pressure drop for a portable mass determination device 100, thereby reducing energy use requirements such as in the form of battery consumption. In that case, elastic element 102 may be advantageously altered as described above for STEP 418.

In one preferred embodiment, process steps such as STEPS 418 and 424 involve altering a number of dimension(s) and/or a number of constituent material(s) of pertinent component(s) of the mass transducer, e.g. the elastic element and/or mass holder.

In particular, mass determination device 100 preferably has properties which are stable with respect to time and temperature. In one preferred embodiment, the production of a mathematically proper normalized temperature coefficient of frequency is deemed unacceptable if that normalized temperature coefficient of frequency would not be stable for the desired tolerance over the intended temperature range.

Figure 4A:
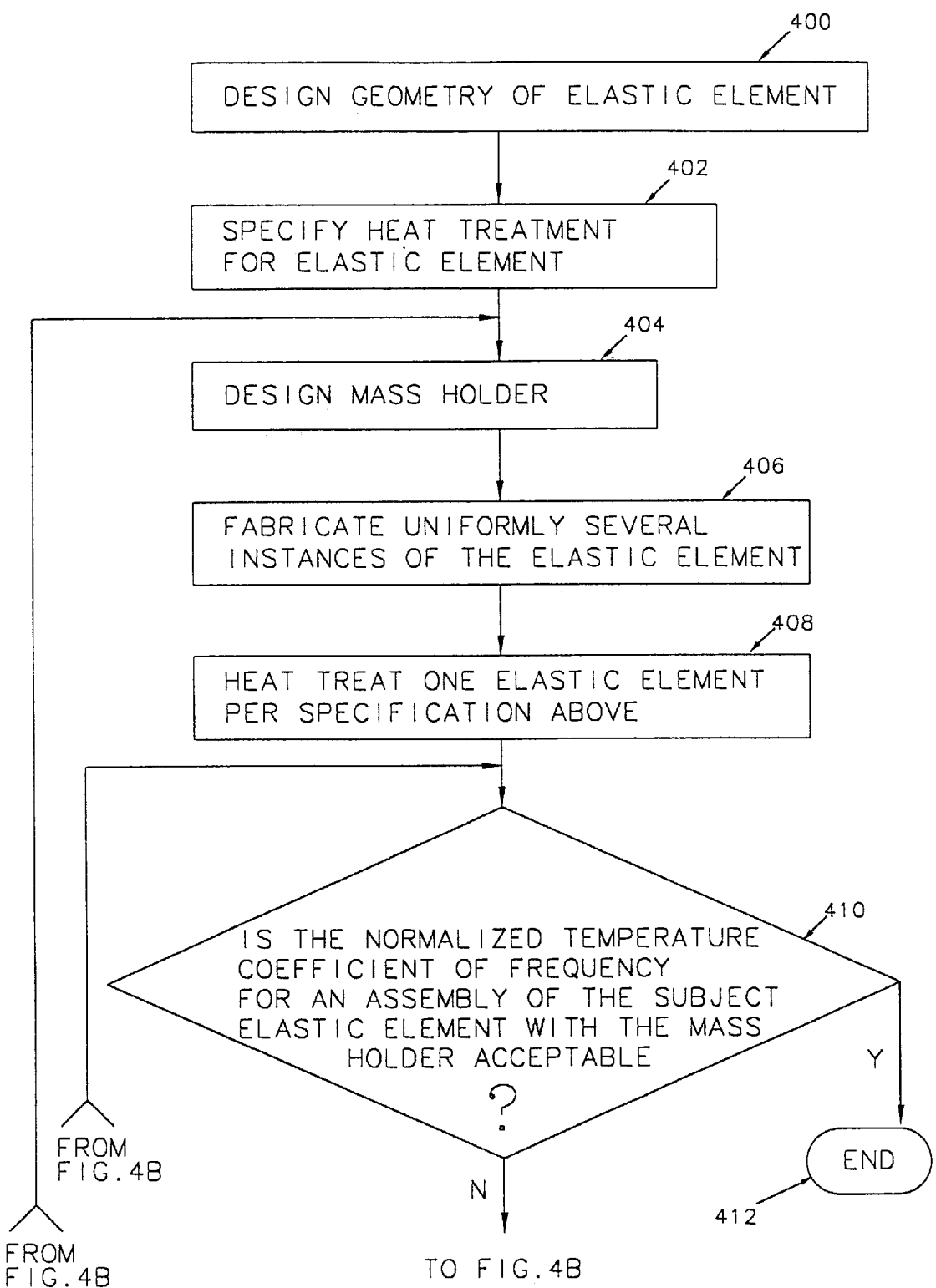
FIGS. 4A and 4B illustrate one embodiment of a flow diagram of one process for forming the mass determination device of FIG. 1, in accordance with the principles of the present invention.
Figure 4B:
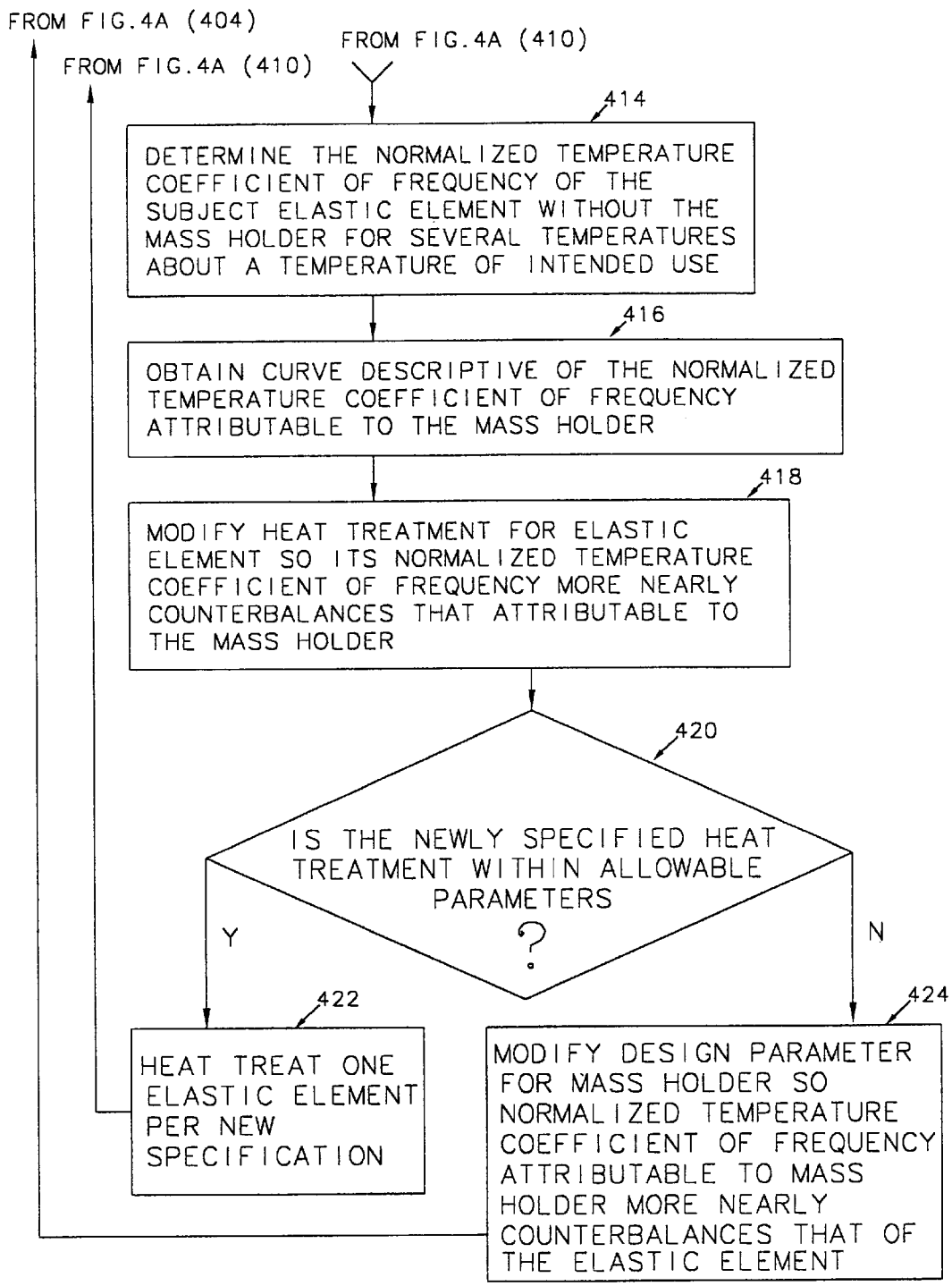

Steps such as are illustrated in FIGS. 4A–4B and described above might be advantageously employed, for example, when a new design is achieved for a mass holder 106. In particular, one does not yet know the behaviors and/or characteristics of the newly designed mass holder as a part of the mass transducer. At that point, the present invention desirably serves to optimize a resulting combination of the newly designed mass holder with an elastic element 102. For example, the subject invention may modify heat treatment and/or composition for the elastic element in order to accommodate the newly designed mass holder.

Once formation and/or combination of any number of components for the mass transducer is optimized, the fabrication of each component can be carried out in large quantities, and the fabrication of all components can be carried out in parallel, to allow subsequent formation of numerous instances of mass determination device 100 each desirably having an overall normalized temperature coefficient of frequency within the selected tolerance of a value of zero, over the temperature range of interest, as will be understood by those skilled in the art.

Mass determination device 100 can be employed for varied (e.g., aerospace to industrial to health maintenance)

applications, in various environments. In one example, the mass determination device may be used to measure particulate matter in ambient (e.g., outdoor) air. In another example, the mass determination device may be used to examine consequences of second-hand smoke from cigarettes. In yet another example, the mass determination device may be used to monitor effectiveness of measures to preserve works of art or historical artifacts while on public display. Moreover, operation of the mass determination device can include periods or intervals of action and inaction, such as an active use followed by idling.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. In an inertial mass determination device, a combination comprising:
    an oscillatory elastic element, and
    a mass holder which oscillates by virtue of being connected with said elastic element, said mass holder serving to hold a sample mass and wherein a change in frequency of oscillation is used to determine mass of the sample mass; and
    said combination having an overall normalized temperature coefficient of frequency substantially equal to zero over a temperature range of intended use for said mass determination device, whereby mass determination accuracy of said device during temperature change in said range is enhanced.

2. The mass determination device of claim 1, wherein said elastic element has a first normalized temperature coefficient of frequency over said temperature range, wherein a second normalized temperature coefficient of frequency over said temperature range is attributable to said mass holder, and wherein said first normalized temperature coefficient and said second normalized temperature coefficient are substantially counterbalanced over said temperature range.

3. The mass determination device of claim 1, wherein said elastic element comprises a hollow tubular member, and wherein said mass holder comprises a filter.

4. The mass determination device of claim 1 wherein said elastic element has a tuning fork configuration.

5. The mass determination device of claim 1, wherein said elastic element includes an Invar alloy.

6. An inertial balance for determining mass of a sample mass through a chance in frequency of oscillation due to mass loading, comprising:
    an oscillatory elastic element having a first normalized temperature coefficient of frequency over a temperature range of intended use for said inertial balance; and
    a mass holder for holding said sample mass, said mass holder oscillating by virtue of being connected with said elastic element, a second normalized temperature coefficient of frequency over said temperature range being attributable to said mass holder, wherein said first normalized temperature coefficient and said second normalized temperature coefficient are substantially counterbalanced over said temperature range, whereby mass determination accuracy of said inertial balance during temperature change in said range is enhanced.

7. The inertial balance of claim 6, wherein said elastic element and said mass holder comprise a combination having an overall normalized temperature coefficient of frequency substantially equal to zero over said temperature range.

8. The inertial balance of claim 6, wherein said elastic element comprises a hollow tubular member, and wherein said mass holder comprises a filter.

9. The inertial balance of claim 6, wherein said elastic element has a tuning fork configuration.

10. The inertial balance of claim 6, wherein said elastic element has a composition including an Invar alloy.

11. A process for enhancing accuracy of an inertial mass determination device adapted to operate during, temperature change in a temperature range of intended use for said mass determination device, said device including a combination of an oscillatory elastic element with a mass holder which oscillates by virtue of being connected with said elastic element, and wherein a chance in frequency of oscillation is used to determine mass of a sample mass held by said mass holder, comprising:
    determining, for an assembly of a test item oscillatory elastic element with said mass holder, a first normalized temperature coefficient of frequency over said temperature range;
    determining, for said test item elastic element without said mass holder, a second normalized temperature coefficient of frequency over said temperature range;
    deriving from said first and second normalized temperature coefficients a third normalized temperature coefficient of frequency over said temperature range attributable to the mass holder alone; and
    employing said third normalized temperature coefficient of frequency to indicate a counterbalancing normalized temperature coefficient of frequency for said elastic element in said combination, wherein said counterbalancing normalized temperature coefficient of frequency serves in said combination to substantially counterbalance the third normalized temperature coefficient of frequency for said mass holder, over said temperature range.

12. The process of claim 11, further comprising mapping behavior of at least one of said first, second, and third normalized temperature coefficients over said temperature range.

13. The process of claim 11, further including modifying heat treatment in formation of said elastic element to provide an oscillatory elastic element exhibiting said counterbalancing normalized temperature coefficient of frequency.

14. The process of claim 11 further comprising varying composition of said elastic element to provide an oscillatory elastic element exhibiting said counterbalancing normalized temperature coefficient of frequency.

15. A process for enhancing accuracy of an inertial mass determination device adapted to operate during temperature change in a temperature range of intended use for said mass determination device, said device including a combination of an oscillatory elastic element with a mass holder which oscillates by virtue of being connected with said elastic element, and wherein a change in frequency of oscillation is used to determine mass of a sample mass held by the mass holder, comprising:

determing for an assembly of a test item mass holder with said oscillatory elastic element, a first normalized temperature coefficient of frequency over said temperature range;

determining, for said elastic element without said test item mass holder, a second normalized temperature coefficient of frequency over said temperature range; and employing said first and second normalized temperature coefficients to indicate a counterbalancing normalized temperature coefficient of frequency attributable to said mass holder in said combination, wherein said counterbalancing normalized temperature coefficient substantially counterbalances said second normalized temperature coefficient in said combination such that said first normalized temperature coefficient of frequency of said combination is substantially equal to zero over said temperature range.

16. The process of claim 15, further comprising mapping behavior of at least one of said first and second normalized temperature coefficients over said temperature range.

17. The process of claim 15, wherein employing includes subtracting said second normalized temperature coefficient from said first normalized temperature coefficient.

18. The process of claim 15, further comprising modifying at least one of mass holder geometry and material in formation of said mass holder to provide said mass holder with said counterbalancing normalized temperature coefficient.

19. In an inertial mass determination device, a combination comprising:

an oscillatory elastic element, and a mass holder which oscillates by virtue of being connected with said elastic element, said mass holder serving to hold a sample mass and wherein a change in frequency of oscillation is used to determine mass of the sample mass; and said combination having an overall temperature coefficient of frequency substantially equal to zero over a temperature range of intended use for said mass determining device, whereby mass determination accuracy of said device during temperature change in said range is enhanced.

20. The mass determination device of claim 19, wherein said elastic element has a first temperature coefficient of frequency over said temperature range, wherein a second temperature coefficient of frequency over said temperature range is attributable to said mass holder, and wherein said first temperature coefficient and said second temperature coefficient are substantially counterbalanced over said temperature range.

* * * * *